United States Patent
Nobuoka

(10) Patent No.: US 12,316,928 B2
(45) Date of Patent: May 27, 2025

(54) IMAGE PROCESSING APPARATUS, IMAGE CAPTURING APPARATUS, IMAGE PROCESSING METHOD, AND STORAGE MEDIUM

(71) Applicant: CANON KABUSHIKI KAISHA, Tokyo (JP)

(72) Inventor: Kosuke Nobuoka, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 94 days.

(21) Appl. No.: 18/356,326

(22) Filed: Jul. 21, 2023

(65) Prior Publication Data
US 2024/0040215 A1 Feb. 1, 2024

(30) Foreign Application Priority Data
Jul. 26, 2022 (JP) .................................. 2022-118871

(51) Int. Cl.
*H04N 23/11* (2023.01)
*G01J 5/08* (2022.01)
*G06T 5/50* (2006.01)
*H04N 23/67* (2023.01)
*G01J 5/00* (2022.01)

(52) U.S. Cl.
CPC .............. *H04N 23/11* (2023.01); *G01J 5/08* (2013.01); *G06T 5/50* (2013.01); *H04N 23/672* (2023.01); *G01J 2005/0077* (2013.01); *G06T 2207/10048* (2013.01)

(58) Field of Classification Search
CPC ......... H04N 23/11; H04N 23/672; G01J 5/08; G01J 2005/0077; G06T 5/50; G06T 2207/10048
See application file for complete search history.

(56) References Cited

U.S. PATENT DOCUMENTS

| | | | |
|---|---|---|---|
| 2014/0112537 A1* | 4/2014 | Frank ...................... | G01V 8/10 315/149 |
| 2022/0044023 A1* | 2/2022 | Xue ...................... | G06V 20/64 |
| 2023/0360247 A1* | 11/2023 | Chew ...................... | G06T 7/70 |
| 2024/0089610 A1* | 3/2024 | Mårtensson ........... | H04N 23/23 |

FOREIGN PATENT DOCUMENTS

| | | |
|---|---|---|
| JP | 2008-174028 A | 7/2008 |
| JP | 2016-085739 A | 5/2016 |

* cited by examiner

*Primary Examiner* — James T Boylan
(74) *Attorney, Agent, or Firm* — Cowan, Liebowitz & Latman, P.C.

(57) ABSTRACT

There is provided an image processing apparatus. An obtainment unit obtains a first image that has been generated through photoelectric conversion of incident light, and temperature distribution information indicating a temperature distribution that has been detected based on an incident electromagnetic wave. A detection unit detects a subject and an obstacle that exists in front of the subject from the first image. An estimation unit estimates a temperature corresponding to the subject in the temperature distribution information based on a result of detection of the obstacle. An identification unit identifies a subject region that includes the subject in the temperature distribution information based on the estimated temperature.

10 Claims, 5 Drawing Sheets

VISIBLE LIGHT IMAGE

| DETECTION INFORMATION | |
|---|---|
| DETECTED SUBJECT | LION |
| DETECTED BODY SURFACE TEMPERATURE | 30.5°C |
| EXPECTED BODY SURFACE TEMPERATURE | 36.0°C |
| DETECTED OBSTACLE | GRASS |

THERMAL IMAGE

IMAGE PROCESSING APPARATUS, IMAGE CAPTURING APPARATUS, IMAGE PROCESSING METHOD, AND STORAGE MEDIUM

BACKGROUND OF THE INVENTION

Field of the Invention

The present invention relates to an image processing apparatus, an image capturing apparatus, an image processing method, and a storage medium.

Description of the Related Art

A CMOS image sensor that is often used in a common camera can generate an image by applying photoelectric conversion to electromagnetic waves in the range of visible light to near infrared (wavelengths of approximately 400 to 1000 nm), in a state where an infrared cut-off filter is not provided therein. Also, a thermal camera equipped with a thermal image sensor (thermal sensor), which can generate an image of heat on a surface of an object by detecting far infrared (longwave infrared (LWIR), with a wavelength of approximately 7 to 14 µm) radiated by the object, has been productized.

A thermal camera performs contactless sensing of the heat of an object with a temperature under a common social environment (e.g., a temperature in the range of approximately −20° C. to 800° C.) as the intensity of radiated infrared, and generates an image of a temperature distribution in a shooting region. This enables a user to recognize the heat of the object as an image. Furthermore, as a thermal sensor detects infrared radiated by an object, it can perform shooting even under an environment where the light amount of visible light is zero, and has been used as, for example, a night-vision camera. In addition, a thermal camera has been widely utilized also as a contactless heat camera in maintaining equipment, making a determination about extinguishment of a fire, measuring a body temperature, and so forth. Moreover, due to its characteristics as both a night-vision camera and a heat camera, a thermal camera has also been utilized as an advanced surveillance camera that especially surveils an object with a specific temperature (a person, an animal, a vehicle, a marine vessel, an aircraft, or the like) in an outdoor field.

Thermal sensors used in thermal cameras include quantum-type sensors that make use of the photoelectric effect of infrared, and heat-type sensors that do not make use of the photoelectric effect. A microbolometer is known as a typical example of the heat-type sensors. A microbolometer is a thermal sensor including a two-dimensional array of minute, thin films that are approximately 10 to 20 µm on a side and made of a metallic material with a high thermal sensitivity to far infrared (e.g., vanadium oxide). When the temperature of a minute electrode has been changed by radiated far infrared, the thermal resistance of the electrode changes. A thermal image can be obtained by electrically detecting the change in the thermal resistance.

With regard to a thermal sensor, the level of difficulty in manufacturing is high, and it is difficult to reduce the size thereof and provide a large number of pixels therein, compared to a common CMOS image sensor. The number of pixels in a thermal sensor is approximately equivalent to the VGA size in many cases, and is approximately equivalent to the Full-HD size (1920×1080) at most even if its size is larger than the VGA size.

Japanese Patent Laid-Open No. 2008-174028 and Japanese Patent Laid-Open No. 2016-85739 disclose techniques to use a visible light camera and a thermal camera in combination. According to the technique of Japanese Patent Laid-Open No. 2008-174028, the thermal camera specifies an image region of an object with a specific temperature, and the object in the specified image region is re-examined on an image of the visible light or near-infrared camera. In a case where the result of the re-examination indicates that the object with the specific temperature is not an expected object (e.g., person), information of the specified image region is deleted. According to the technique of Japanese Patent Laid-Open No. 2016-85739, the thermal camera specifies a region of an object with a specific temperature, and then parameters for visible light image processing are changed in order to improve the visibility of the object with the specific temperature on a visible light image.

During the surveillance of an object with a specific temperature (a person, an animal, a vehicle, a marine vessel, an aircraft, or the like) using a thermal camera, an obstacle (plants, tree branches, a cloud of dust, or the like) that does not completely hide the object to be surveilled may appear between the object to be surveilled and the thermal camera. In this case, due to, for example, a relatively small number of pixels in a thermal sensor, the thermal sensor may not be able to detect far infrared from the object to be surveilled in distinction from far infrared from the obstacle. In this case, the heat of the object to be surveilled and the heat of the obstacle are mixed, and a thermal image shows a region of a temperature that is different from (lower or higher than) the expected temperature of the object to be surveilled. However, whether this temperature difference is attributed to the existence of the obstacle cannot be determined solely based on the thermal image. Thus, if an obstacle exists between the object to be surveilled and the thermal camera, the accuracy of detection of the object to be surveilled decreases. The techniques of Japanese Patent Laid-Open No. 2008-174028 and Japanese Patent Laid-Open No. 2016-85739 cannot address such a problem.

SUMMARY OF THE INVENTION

The present invention has been made in view of the foregoing situation, and provides a technique to improve the accuracy of subject detection based on temperature distribution information that indicates a temperature distribution that has been detected based on an incident electromagnetic wave.

According to a first aspect of the present invention, there is provided an image processing apparatus, comprising at least one processor and/or at least one circuit which functions as: an obtainment unit configured to obtain a first image that has been generated through photoelectric conversion of incident light, and temperature distribution information indicating a temperature distribution that has been detected based on an incident electromagnetic wave; a detection unit configured to detect a subject and an obstacle that exists in front of the subject from the first image; an estimation unit configured to estimate a temperature corresponding to the subject in the temperature distribution information based on a result of detection of the obstacle; and an identification unit configured to identify a subject region that includes the subject in the temperature distribution information based on the estimated temperature.

According to a second aspect of the present invention, there is provided an image capturing apparatus, comprising: the image processing apparatus according to the first aspect;

an image sensor configured to generate the first image through photoelectric conversion of the incident light; and a temperature distribution detector configured to generate the temperature distribution information by detecting the temperature distribution based on the incident electromagnetic wave.

According to a third aspect of the present invention, there is provided an image processing method executed by an image processing apparatus, comprising: obtaining a first image that has been generated through photoelectric conversion of incident light, and temperature distribution information indicating a temperature distribution that has been detected based on an incident electromagnetic wave; detecting a subject and an obstacle that exists in front of the subject from the first image; estimating a temperature corresponding to the subject in the temperature distribution information based on a result of detection of the obstacle; and identifying a subject region that includes the subject in the temperature distribution information based on the estimated temperature.

According to a fourth aspect of the present invention, there is provided a non-transitory computer-readable storage medium which stores a program for causing a computer to execute an image processing method comprising: obtaining a first image that has been generated through photoelectric conversion of incident light, and temperature distribution information indicating a temperature distribution that has been detected based on an incident electromagnetic wave; detecting a subject and an obstacle that exists in front of the subject from the first image; estimating a temperature corresponding to the subject in the temperature distribution information based on a result of detection of the obstacle; and identifying a subject region that includes the subject in the temperature distribution information based on the estimated temperature.

Further features of the present invention will become apparent from the following description of exemplary embodiments with reference to the attached drawings.

DESCRIPTION OF THE EMBODIMENTS

Figure 1:
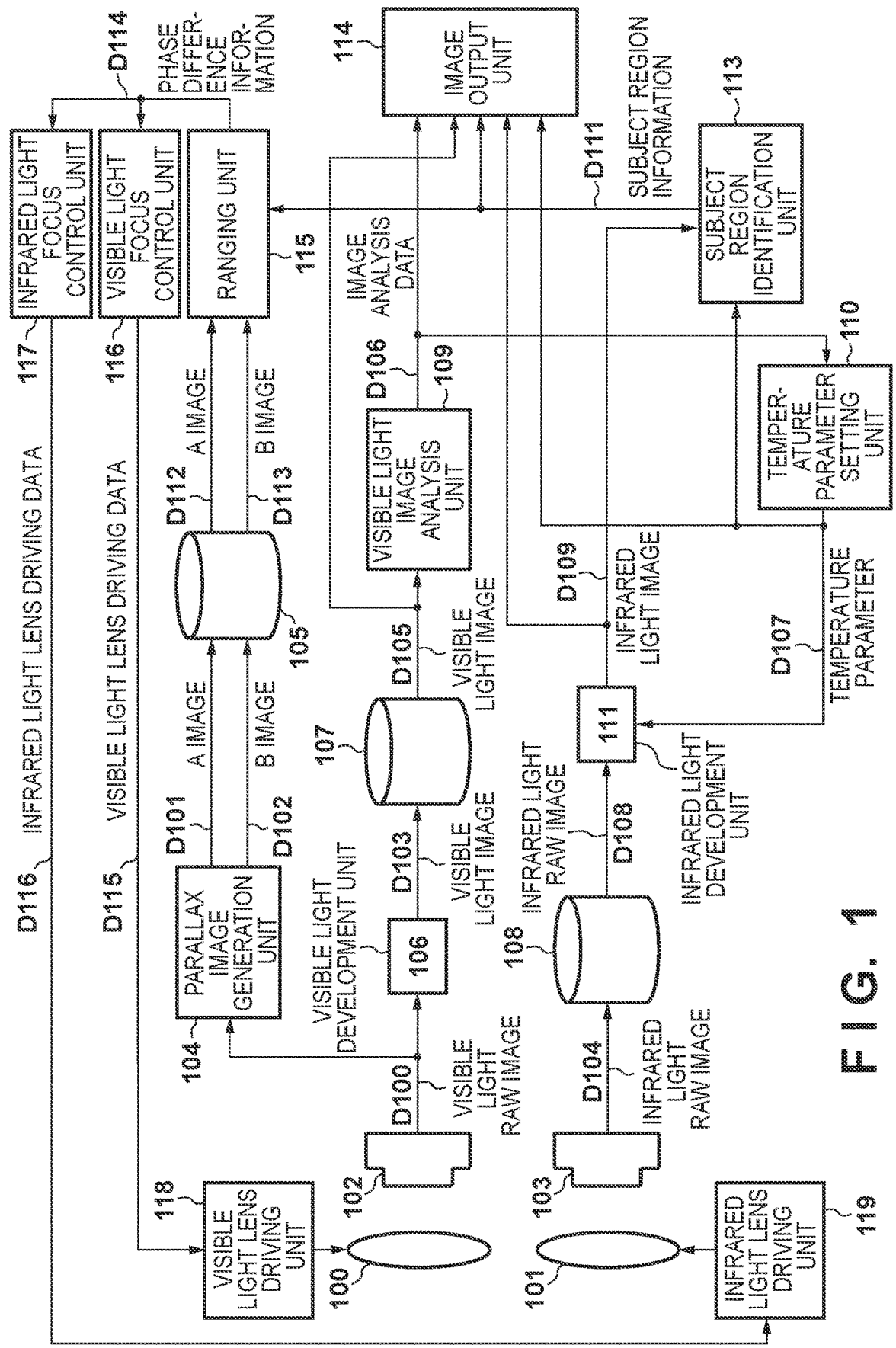
FIG. 1 is a system configuration diagram of an image capturing apparatus.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

FIRST EMBODIMENT

Configuration of Image Capturing Apparatus

FIG. 1 is a system configuration diagram of an image capturing apparatus according to a first embodiment. This image capturing apparatus also functions as an image processing apparatus. In FIG. 1, 100 denotes a visible light optical system, 101 denotes an infrared light optical system, 102 denotes a CMOS image sensor, 103 denotes a microbolometer, 104 denotes a parallax image generation unit, 105 denotes a parallax image memory, and 106 denotes a visible light development unit. Also, 107 denotes a visible light image memory, 108 denotes an infrared light RAW image memory, 109 denotes a visible light image analysis unit, 110 denotes a temperature parameter setting unit, 111 denotes an infrared light development unit, and 113 denotes a subject region identification unit. Furthermore, 114 denotes an image output unit, 115 denotes a ranging unit, 116 denotes a visible light focus control unit, 117 denotes an infrared light focus control unit, 118 denotes a visible light lens driving unit, and 119 denotes an infrared light lens driving unit.

Each component and each memory in the image capturing apparatus shown in FIG. 1 can be implemented based on any known technique with use of such hardware as a CPU and a memory (a ROM, a RAM, or the like), such software as a control program, or a combination of hardware and software. Note that no particular limitation is intended regarding a specific implementation method.

Also, D100 denotes a visible light RAW image, D101 denotes an A image, D102 denotes a B image, D103 denotes a visible light image, D104 denotes an infrared light RAW image, D105 denotes a visible light image, D106 denotes image analysis data, and D107 denotes temperature parameters. Furthermore, D108 denotes an infrared light RAW image, D109 denotes an infrared light image, D111 denotes subject region information, D112 denotes an A image, and D113 denotes a B image. In addition, D114 denotes phase difference information, D115 denotes visible light lens driving data, and D116 denotes infrared light lens driving data.

Processing for Generating Parallax Images, Visible Light Image, and Infrared Light RAW Image With reference to FIG. 1, a description is now given of processing in which the image capturing apparatus generates parallax images, a visible light image, and an infrared light RAW image.

The CMOS image sensor 102 generates a visible light RAW image D100 by applying photoelectric conversion to visible light that has been incident via the visible light optical system 100 (incident light). The CMOS image sensor 102 includes a control unit and a pixel unit that includes a plurality of divided pixels, and is configured to generate information for image-plane phase detection autofocus (AF). Any known configuration can be used as a specific configuration of the CMOS image sensor 102. The visible light RAW image D100 is transmitted to the visible light development unit 106 and the parallax image generation unit 104.

The parallax image generation unit 104 executes division processing with respect to the visible light RAW image D100, thereby generating a plurality of parallax images that exhibit parallax relative to each other. In the example of FIG. 1, the number of parallax images is two, and the two parallax images are denoted by "A image" and "B image", respectively. The A image and the B image generated by the parallax image generation unit 104 are transferred to the parallax image memory 105 as the A image D101 and the B image D102, respectively, and temporarily stored into the parallax image memory 105.

The visible light development unit 106 generates a visible light image D103 by executing development processing with respect to the visible light RAW image D100. The visible light image D103 is temporarily stored into the visible light image memory 107.

The microbolometer 103 generates an infrared light RAW image D104 by performing temperature distribution detection based on electromagnetic waves that have been incident via the infrared light optical system 101. The electromagnetic waves that have been incident via the infrared light optical system 101 include far-infrared light. In the present specification, for the sake of simplicity, the far-infrared light used in the temperature distribution detection may be simply referred to as "infrared light". The infrared light RAW image D104 is temporarily stored into the infrared light RAW image memory 108.

Figure 2:
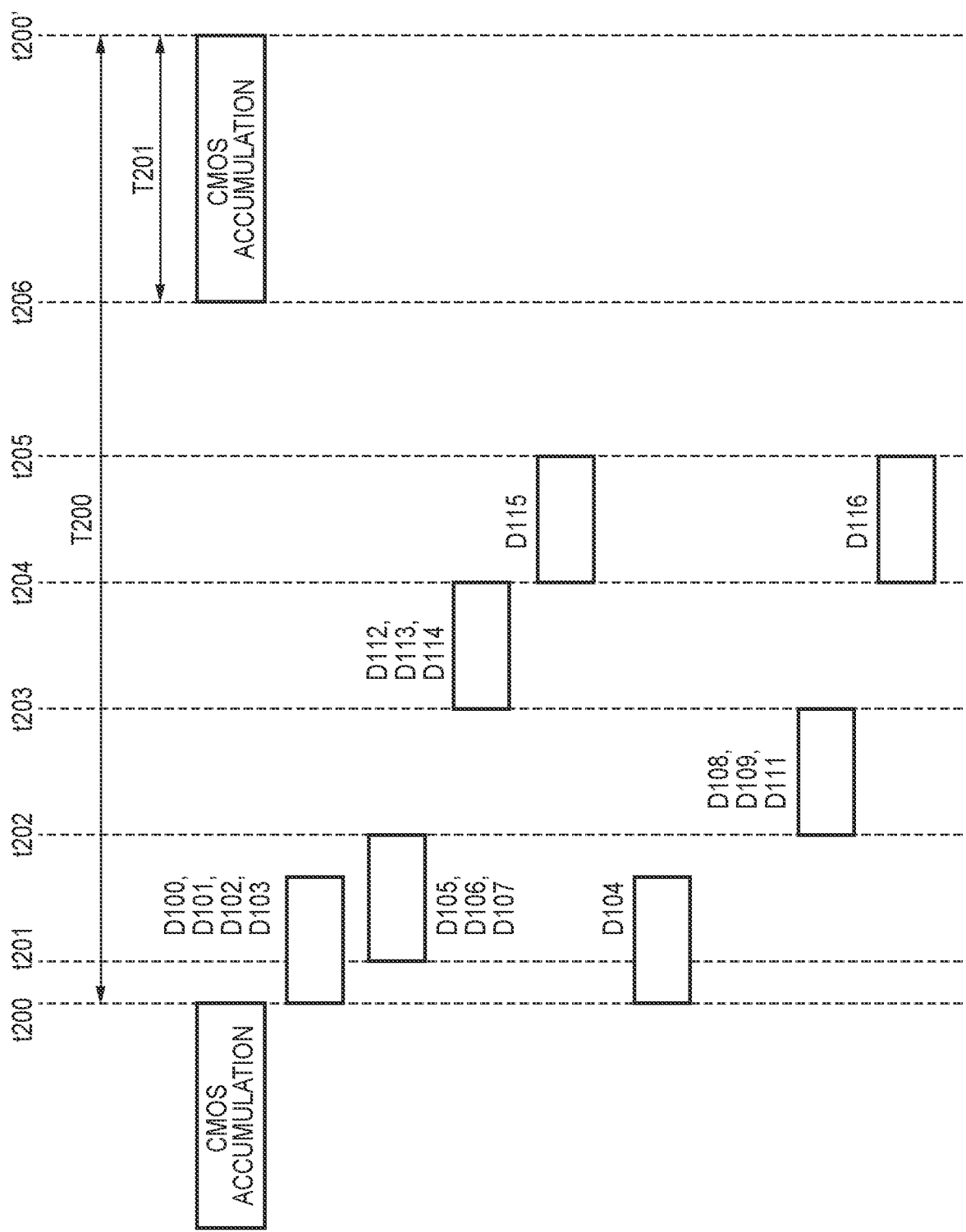
FIG. 2 is a timing chart of processing executed by the image capturing apparatus.

Next, with reference to a timing chart of FIG. 2, a description is given of individual processing timings in the above-described processing for generating the parallax images, the visible light image, and the infrared light RAW image. In FIG. 2, T200 denotes a frame cycle (one frame period), and T201 denotes a CMOS accumulation period (a period in which the CMOS image sensor 102 accumulates charges) for one frame. t200 to t207 denote various timings in one frame period.

t200 is the timing of the beginning of a frame cycle; at t200, the CMOS image sensor 102 completes the accumulation of charges, and starts reading out pixel signals. Furthermore, at t200, the microbolometer 103 also starts reading out pixel signals. Note that the concept of accumulation does not exist in the microbolometer 103. Along with the start of the readout, processing for generating the visible light RAW image D100, the parallax images (the A image D101 and the B image D102), the visible light image D103, and the infrared light RAW image D104 is started. The parallax images (the A image D101 and the B image D102) are stored into the parallax image memory 105, the visible light image D103 is stored into the visible light image memory 107, and the infrared light RAW image D104 is stored into the infrared light RAW image memory 108.

Image Analysis Processing

With reference to FIG. 1, the following describes image analysis processing executed by the image capturing apparatus.

The visible light image D103 stored in the visible light image memory 107 is read out as a visible light image D105 and input to the visible light image analysis unit 109. The visible light image analysis unit 109 generates image analysis data D106 by executing the image analysis processing with respect to the visible light image D105. The image analysis data D106 is input to the temperature parameter setting unit 110. The temperature parameter setting unit 110 generates temperature parameters D107 based on the image analysis data D106.

The details of processing executed by the visible light image analysis unit 109 and the temperature parameter setting unit 110 are now described with reference to FIG. 3 and FIG. 4.

Figure 3:
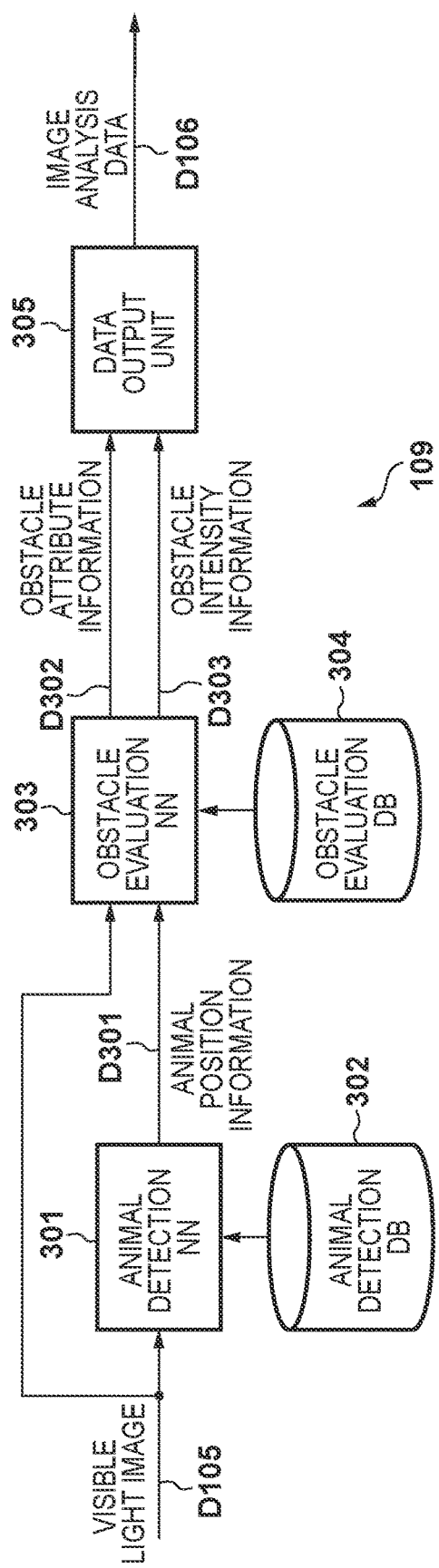
FIG. 3 is a diagram showing a detailed configuration of a visible light image analysis unit 109.

In FIG. 3, 301 denotes an animal detection neural network (NN), 302 denotes an animal detection database (DB), 303 denotes an obstacle evaluation neural network (NN), 304 denotes an obstacle evaluation database (DB), and 305 denotes a data output unit. Furthermore, D301 denotes animal position information, D302 denotes obstacle attribute information, D303 denotes obstacle intensity information, and D106 denotes image analysis data.

Figure 4:
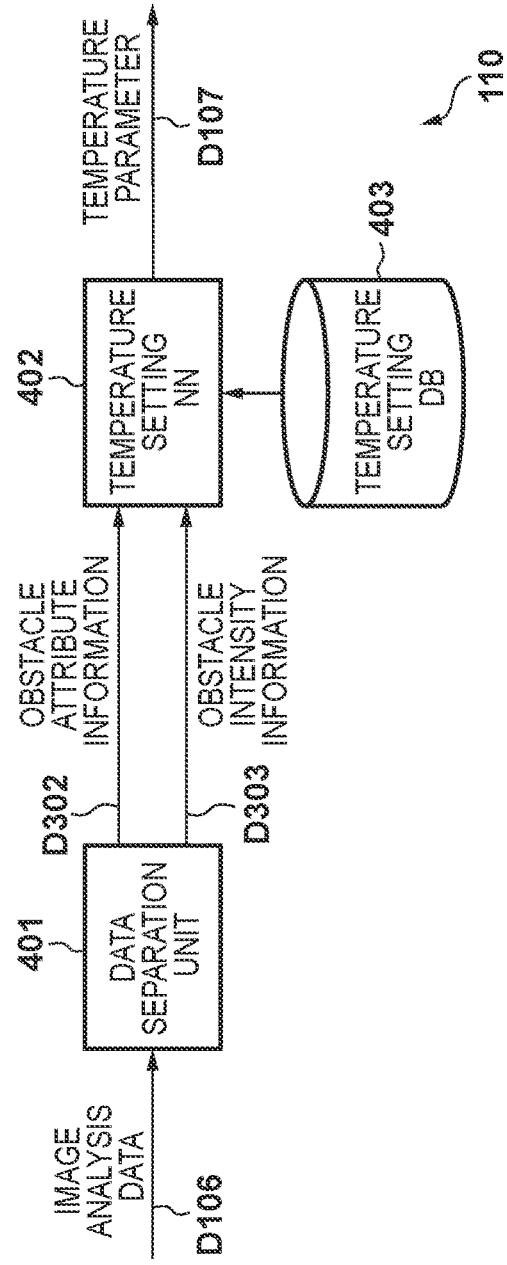
FIG. 4 is a diagram showing a detailed configuration of a temperature parameter setting unit 110.

In FIG. 4, 401 denotes a data separation unit, 402 denotes a temperature setting neural network (NN), and 403 denotes a temperature setting database (DB).

The animal detection NN 301 of FIG. 3 performs computation according to a pre-configured neural network structure using the animal detection DB 302, thereby generating animal position information D301 indicating the position of a specific animal (a subject to be surveilled) included in the visible light image D105. Here, the animal detection DB 302 has been generated in advance using training images of the specific animal and a predetermined training algorithm.

Using the obstacle evaluation DB 304 and the animal position information D301, the obstacle evaluation NN 303 analyzes whether an obstacle, such as grass, tree branches and leaves, and a cloud of dust, exists in front of the specific animal in the visible light image D105. The obstacle evaluation NN 303 generates obstacle attribute information D302 indicating a type of the obstacle, as well as obstacle intensity information D303 indicating a density degree of the obstacle, as a result of such analysis (a result of detection of the obstacle). Here, the obstacle evaluation DB 304 has been generated in advance using a plurality of types of training object images that can be an obstacle to animal detection, such as grass, tree branches and leaves, and a cloud of dust, as well as a predetermined training algorithm.

The data output unit 305 groups the obstacle attribute information D302 and the obstacle intensity information D303 in accordance with a predetermined format, and outputs them as image analysis data D106.

Next, the data separation unit 401 of FIG. 4 separates the obstacle attribute information D302 and the obstacle intensity information D303 from the image analysis data D106. The temperature setting NN 402 generates temperature parameters D107 by estimating how the expected body surface temperature of the specific animal will change in the condition of the obstacle indicated by the obstacle attribute information D302 and the obstacle intensity information D303 using the temperature setting DB 403.

The temperature parameters D107 include, for example, Center (° C.), W (° C.), and the expected body surface temperature of the specific animal.

Center (° C.) and W (° C.) are examples of parameters used by the infrared light development unit 111 and the subject region identification unit 113 among parameters included in the temperature parameters D107. Center (° C.) denotes the expected temperature of an object to be surveilled (the specific animal), whereas W (° C.) denotes the range of temperatures to be surveilled, centered at the expected temperature. For example, in a case where the body surface temperature of the specific animal is expected to be 36° C. and there is no influence of the obstacle, Center=36 (° C.). Also, in consideration of fluctuations in the body surface temperature caused by the ambient temperature and the like, the setting of W=20 (° C.) is configured, for example. The details of processing of the infrared light development unit 111 that uses Center (° C.) and W (° C.) will be described later with reference to FIG. 5.

The expected body surface temperature of the specific animal is an example of parameters used by the image output unit 114 among parameters included in the temperature parameters D107. The details of processing of the image output unit 114 that uses the expected body surface temperature of the specific animal will be described later.

For example, the temperature setting NN 402 can estimate that "in a case where grass that has been currently detected exists in front of an object of 36° C., the object appears in a thermal image as an object of 30.5° C.". Therefore, even in a case where the body surface temperature of the specific animal is expected to be 36° C., a temperature that has been estimated based on the result of detection of an obstacle is set, such as Center=30.5 (° C.), in accordance with the condition of the obstacle.

Here, the temperature setting DB 403 has been generated in advance using the attribute and the density degree of the obstacle, such as grass, tree branches and leaves, and a cloud of dust, the body surface temperature of the specific animal in a case where the obstacle, such as grass, tree branches and leaves, and a cloud of dust, does not exist, and a predetermined training algorithm.

Note that any known structures, training methods, and operations can be used as the structures, training methods, and operations of the above-described animal detection NN 301, obstacle evaluation NN 303, and temperature setting NN 402.

Furthermore, according to the above description, it has been assumed that the animal detection NN 301 generates and outputs the animal position information D301. However, the animal detection NN 301 may output information (animal type information) indicating a type of an animal (a type of a subject that has been detected), in addition to the animal position information D301. In this case, the obstacle evaluation NN 303 can transfer the animal type information to the data output unit 305, and the data output unit 305 can include the animal type information in the image analysis data D106. The data separation unit 401 separates the animal type information from the image analysis data D106, and transfers the animal type information to the temperature setting NN 402. In this way, the temperature setting NN 402 can estimate the temperature of a surveillance target based on not only the obstacle attribute information D302 and the obstacle intensity information D303, but also the animal type information. By adopting a configuration that utilizes the animal type information in the above-described manner, appropriate temperature estimation can be performed in accordance with a type of an animal that has been actually detected, even in a case where a type of an animal to be detected is unknown beforehand and the temperature in the case where there is no influence of an obstacle is unknown beforehand. This makes it possible to realize an image capturing apparatus that can surveil a plurality of types of animals (subjects).

Next, with reference to the timing chart of FIG. 2, a description is given of individual processing timings in the above-described image analysis processing.

At t201, the readout of the visible light image D105 from the visible light image memory 107 is started. t201 is a timing at which a predetermined period has elapsed since t200, which is a timing at which storing of the visible light image D103 is started. The time difference between t200 and t201 can be set at the smallest time difference possible in a range where the accesses to the same address in a physical memory (e.g., DRAM) equipped with the visible light image memory 107 by way of writing and reading can be made in a desired order.

In parallel with the readout of the visible light image D105, the generation of the image analysis data D106 and the temperature parameters D107 is executed, which is completed at t202. t202 is also a timing at which the readout of an infrared light RAW image D108, which will be described later, is started.

Processing from Development of Infrared Light RAW Image D104 to Generation of Subject Region Information D111

With reference to FIG. 1, the following describes processing executed by the image capturing apparatus, from development of the infrared light RAW image D104 to generation of the subject region information D111.

The infrared light RAW image D104 stored in the infrared light RAW image memory 108 is read out as an infrared light RAW image D108, and input to the infrared light development unit 111. The infrared light development unit 111 generates an infrared light image D109 by executing development processing with respect to the infrared light RAW image D108 based on the temperature parameters D107 input from the temperature parameter setting unit 110. The infrared light image D109 is input to the subject region identification unit 113.

The subject region identification unit 113 identifies a region of a subject in the infrared light image D109 based on the estimated temperature (Center) of the subject (a specific animal to be surveilled), and generates subject region information D111 indicating the region of the subject. No particular limitation is intended regarding an identification method; for example, the subject region identification unit 113 can identify the region of the subject by executing grouping processing with respect to pixels in a predetermined temperature range including the temperatures corresponding to the subject. The grouping processing for pixels corresponding to the specific temperature can be executed using any known technique.

Note that the infrared light image D109 is different from the infrared light RAW image D108 in that it is a developed image with enhanced contrast in the temperature range of Center±W (° C.). However, as can be understood from FIG. 5, both of the infrared light image D109 and the infrared light RAW image D108 include information of the temperature range of Center±W (° C.). Therefore, the subject region identification unit 113 may identify the region of the subject in the infrared light RAW image D108 instead of the infrared light image D109. Regardless of which one of the infrared light image D109 and the infrared light RAW image D108 is used, the region of the subject is identified in information indicating the temperature distribution detected by the microbolometer 103 (temperature distribution information) as a result of processing of the subject region identification unit 113.

Figure 5:
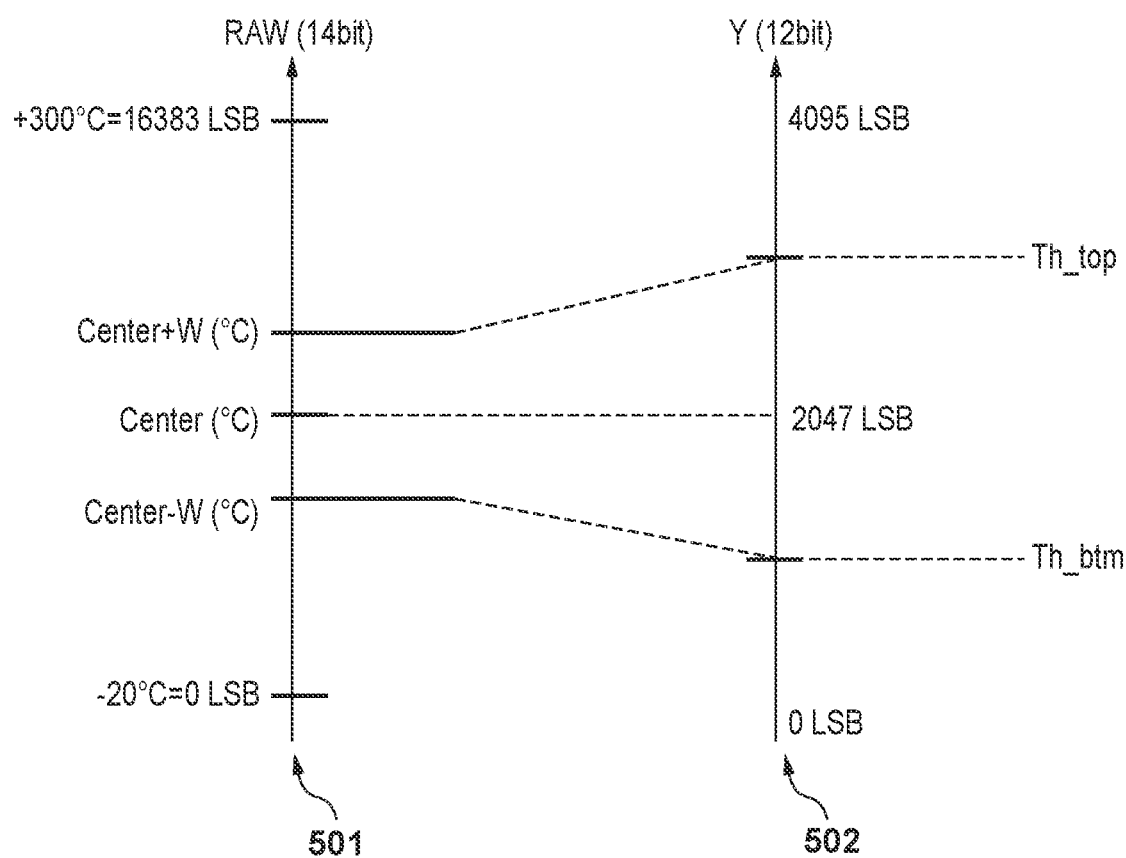
FIG. 5 is a diagram for describing the details of processing executed by an infrared light development unit 111.

With reference to FIG. 5, a description is now given of the details of processing executed by the infrared light development unit 111. In FIG. 5, 501 denotes an example of a bit range of the infrared light RAW image D108. In the example of FIG. 5, the infrared light RAW image D108 is a 14-bit RAW image, with each pixel having a value in the range from 0 to 16383. 0 indicates −20° C., and 16383 indicates +300° C. Center (° C.) and W (° C.) are examples of parameters used by the infrared light development unit 111 and the subject region identification unit 113 among parameters included in the temperature parameters D107. Center (° C.) denotes the expected temperature of an object to be surveilled, whereas W (° C.) denotes the range of temperatures to be surveilled, centered at the expected temperature. As stated earlier, in a case where there is no influence of an obstacle, the settings of Center=36 (° C.) and W=20 (° C.)

are configured, for example. Furthermore, in a case where there is an influence of an obstacle, a temperature that has been estimated based on the result of detection of the obstacle, such as Center=30.5 (° C.), is set. Note that Center (° C.) is also used by the image output unit 114.

502 denotes an example of a bit range of the infrared light image D109. In the example of FIG. 5, the infrared light image D109 is a 12-bit luminance image, with each pixel having a value in the range from 0 to 4095.

The infrared light development unit 111 generates the infrared light image D109 by tone-mapping Center (° C.) to 2047, and Center±W (° C.) to Th_btm and Th_top. Th_top and Th_btm are preset values; for example, Th_top=2047+1024, and Th_btm=2047−1024. In this case, the temperature range of Center±W (° C.) in the infrared light RAW image D108 is mapped to the luminance values of 2047±1024 in the infrared light image D109. Furthermore, with regard to pixels in the infrared light RAW image D108 that correspond to temperatures outside the temperature range of Center±W (° C.), a value indicating an invalid pixel (e.g., a luminance value=0) is set in the infrared light image D109. As a result, the infrared light image D109 becomes an image in which the contrast in a temperature range to be surveilled (a predetermined temperature range including an estimated temperature of a subject) is more enhanced than the contrast outside the temperature range to be surveilled. Note that tone mapping processing can be executed using any known technique.

Next, with reference to the timing chart of FIG. 2, a description is given of individual processing timings in the above-described processing from development of the infrared light RAW image D104 to generation of the subject region information D111.

The readout of the infrared light RAW image D108 from the infrared light RAW image memory 108 is started at t202, which is a timing at which the generation of the temperature parameters D107 is completed. Note that as shown in FIG. 2, storing of the infrared light RAW image D104 is already completed at t202.

In parallel to the readout of the infrared light RAW image D108, the generation of the infrared light image D109 and the subject region information D111 is executed, which is completed at t203. t203 is also a timing at which the readout of an A image D112 and a B image D113, which will be described later, is started.

Processing for Generating Phase Difference Information D114

With reference to FIG. 1, the following describes processing in which the image capturing apparatus generates phase difference information D114.

The A image D101 and the B image D102 stored in the parallax image memory 105 are read out as an A image D112 and a B image D113, and input to the ranging unit 115. Furthermore, the subject region information D111 is also input to the ranging unit 115.

The ranging unit 115 generates the phase difference information D114 by computing the amount of displacement between the A image D112 and the B image D113 with respect to the region indicated by the subject region information D111. The computation of the amount of displacement in the ranging unit 115 can be executed using any known technique.

Next, with reference to the timing chart of FIG. 2, a description is given of individual processing timings in the above-described processing for generating the phase difference information D114.

The readout of the A image D112 and the B image D113 from the parallax image memory 105 is started at t203, at which the generation of the subject region information D111 is completed. In parallel with the readout of the A image D112 and the B image D113, the generation of the phase difference information D114 is also started, which is completed at t204. t204 is also a timing at which focus adjustment processing (AF control) is started.

Focus Adjustment Processing (AF Control)

With reference to FIG. 1, the following describes focus adjustment processing (AF control) executed by the image capturing apparatus.

The phase difference information D114 is input to the visible light focus control unit 116 and the infrared light focus control unit 117. The visible light focus control unit 116 generates visible light lens driving data D115 by calculating the amount of movement of a focusing lens included in the visible light optical system 100 based on the phase difference information D114, and applying an error correction associated with lens aberration to the calculated amount of movement.

The infrared light focus control unit 117 generates infrared light lens driving data D116 by calculating the amount of movement of a focusing lens included in the infrared light optical system 101 based on the phase difference information D114, and applying an error correction associated with lens aberration to the calculated amount of movement.

The visible light lens driving data D115 and the infrared light lens driving data D116 are set in the visible light lens driving unit 118 and the infrared light lens driving unit 119, respectively. The visible light lens driving unit 118 adjusts the focus of the visible light optical system 100 by driving the focusing lens included in the visible light optical system 100 based on the visible light lens driving data D115. The infrared light lens driving unit 119 adjusts the focus of the infrared light optical system 101 by driving the focusing lens included in the infrared light optical system 101 based on the infrared light lens driving data D116. As a result, AF control for the subject included in the region indicated by the subject region information D111 (i.e., the object to be surveilled) is completed.

As described above, the image capturing apparatus of the present embodiment performs focus control for the CMOS image sensor 102 and the microbolometer 103 based on the state of focus in the region inside the visible light image that corresponds to the subject region in the infrared light image. Consequently, the subject can be brought into focus more accurately.

Next, with reference to the timing chart of FIG. 2, a description is given of individual processing timings in the above-described focus adjustment processing (AF control). The generation of the visible light lens driving data D115 and the infrared light lens driving data D116, the operations of the visible light lens driving unit 118 and the infrared light lens driving unit 119, and the movements of the focusing lens included in the visible light optical system 100 and the focusing lens included in the infrared light optical system 101 are started at t204, which is a timing at which the generation of the phase difference information D114 is completed, and are completed at t205.

The image capturing apparatus can set the frame cycle T200 shown in FIG. 2 at 1/30 sec, which is a standard frame cycle for the microbolometer 103. In this case, the image capturing apparatus can perform shooting in a state where the subject has been brought into focus on a frame-by-frame basis, with respect to both of the visible light optical system 100 and the infrared light optical system 101.

Note that the accumulation of charges in the CMOS image sensor 102 for the next frame is started at t206, and completed at t200'. t200' is the timing of the beginning of a frame cycle for the next frame. With respect to the next frame as well, processing that is similar to processing from t200 to t206 related to the current frame is executed.

Processing for Generating and Outputting Display Images

With reference to FIG. 1, the following describes processing in which the image capturing apparatus generates and outputs display images.

The visible light image D105, the infrared light image D109, the image analysis data D106, the temperature parameters D107, and the subject region information D111 are input to the image output unit 114. The image output unit 114 generates display images based on these images, data, parameters, and information that have been input. The image output unit 114 outputs the generated display images to a display (not shown) of the image capturing apparatus. Furthermore, the image output unit 114 distributes the generated display images to an external surveillance system (not shown) via, for example, a communication network.

Figure 6:
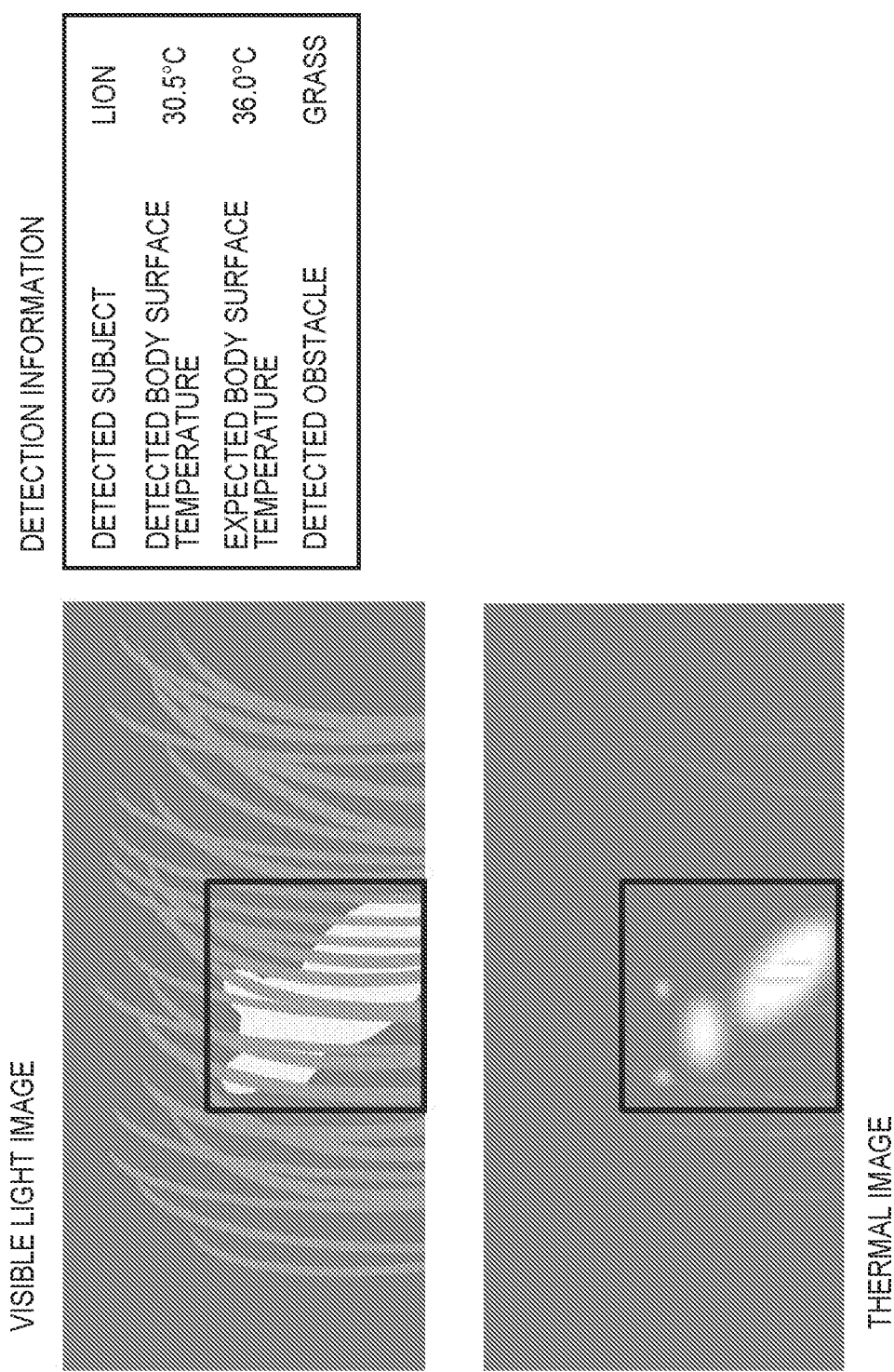
FIG. 6 is a diagram showing examples of display images generated by an image output unit 114.

FIG. 6 shows examples of the display images generated by the image output unit 114. According to the examples of FIG. 6, the display images include a visible light image, a thermal image, and an image indicating detection information. Furthermore, a frame based on the subject region information D111 (i.e., a frame indicating the region of the object to be surveilled) is superimposed on the visible light image and the thermal image.

The detection information includes information indicating a type (a lion according to the examples of FIG. 6) of the detected subject (object to be surveilled), and information indicating a type (grass according to the examples of FIG. 6) of the detected obstacle, as information based on the image analysis data D106. Furthermore, the detection information includes the expected body surface temperature and the detected body surface temperature of the object to be surveilled (specific animal) as information based on the temperature parameters D107. The expected body surface temperature is a body surface temperature that is expected in a case where there is no influence of the obstacle, and is 36.0° C. according to the examples of FIG. 6. The detected body surface temperature corresponds to "Center", which has been described with reference to FIG. 4 and FIG. 5, and is 30.5° C. according to the examples of FIG. 6.

Therefore, by confirming the displayed detection information, a surveillant can obtain information indicating whether the temperature indicated by the thermal image has fluctuated due to the obstacle, and to what extent the temperature has fluctuated if the fluctuation has occurred.

As described above, the image output unit 114 can provide notification of various types of information included in the display images by generating and outputting the display images.

Furthermore, as AF control is performed with respect to a subject in a range of a frame based on the subject region information D111 (the details of AF control are as described above), the subject in this region can be brought into focus.

Note that according to the examples of FIG. 6, although a so-called conflict between far objects and near objects can occur due to the existence of grass in front of the lion, which is the object to be surveilled, the conflict between far objects and near objects can be fixed by using any known technique.

Summary of First Embodiment

As described above, according to the first embodiment, the image capturing apparatus obtains an image (a first image) that has been generated by the CMOS image sensor 102 through photoelectric conversion of incident light. Also, the image capturing apparatus obtains an image (temperature distribution information) indicating the temperature distribution that has been detected by the microbolometer 103 based on incident electromagnetic waves. The image capturing apparatus detects a subject (e.g., a lion) and an obstacle that exists in front of the subject (e.g., grass, tree branches, a cloud of dust, or the like) from the first image. Based on the result of detection of the obstacle, the image capturing apparatus estimates the temperature corresponding to the subject in the temperature distribution information. Then, based on the estimated temperature, the image capturing apparatus identifies a subject region that includes the subject in the temperature distribution information. The temperature distribution information that is used in identifying the subject region may be an image before the development, such as the infrared light RAW image D108, or may be an image after the development, such as the infrared light image D109.

As described above, according to the present embodiment, the temperature that has been estimated based on the result of detection of an obstacle in an image generated through photoelectric conversion of incident light is used as the temperature of a subject that is referenced in detecting the subject (identifying the subject region) based on the temperature distribution information. This makes it possible to improve the accuracy of subject detection based on the temperature distribution information indicating the temperature distribution that has been detected based on incident electromagnetic waves.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-118871, filed Jul. 26, 2022, which is hereby incorporated by reference herein in its entirety.

What is claimed is:

1. An image processing apparatus, comprising at least one processor and/or at least one circuit which functions as:
   an obtainment unit configured to obtain a first image that has been generated through photoelectric conversion of incident light, and temperature distribution information indicating a temperature distribution that has been detected based on an incident electromagnetic wave;
   a detection unit configured to detect a subject and an obstacle that exists in front of the subject from the first image;
   an estimation unit configured to estimate a temperature corresponding to the subject, in front of which the obstacle exists, in the temperature distribution information based on a result of detection of the obstacle that indicates a type and density degree of the obstacle; and
   an identification unit configured to identify a subject region that includes the subject in the temperature distribution information based on the estimated temperature.

2. The image processing apparatus according to claim 1, wherein
   the estimation unit estimates the temperature corresponding to the subject, in front of which the obstacle exists, in the temperature distribution information further based on a type of the detected subject and the result of detection of the obstacle that indicates the type and density degree of the obstacle.

3. The image processing apparatus according to claim 1, wherein
   the at least one processor and/or the at least one circuit further functions as a notification unit configured to provide notification of at least one of a position of the subject region in the temperature distribution information, a position of a region which is inside the first image and which corresponds to the subject region, the estimated temperature, and the result of detection of the obstacle.

4. The image processing apparatus according to claim 1, wherein
   the at least one processor and/or the at least one circuit further functions as a generation unit configured to generate a second image indicating the temperature distribution based on the temperature distribution information so that contrast in a predetermined temperature range including the estimated temperature is more enhanced than contrast outside the predetermined temperature range.

5. An image capturing apparatus, comprising:
   the image processing apparatus according to claim 1;
   an image sensor configured to generate the first image through photoelectric conversion of the incident light; and
   a temperature distribution detector configured to generate the temperature distribution information by detecting the temperature distribution based on the incident electromagnetic wave.

6. The image capturing apparatus according to claim 5, wherein
   the at least one processor and/or the at least one circuit further functions as a control unit configured to perform focus control for the image sensor and the temperature distribution detector based on a state of focus in a region which is inside the first image and which corresponds to the subject region.

7. The image capturing apparatus according to claim 5, wherein
   the incident light includes visible light.

8. The image capturing apparatus according to claim 5, wherein
   the incident electromagnetic wave includes far-infrared light.

9. An image processing method executed by an image processing apparatus, comprising:
   obtaining a first image that has been generated through photoelectric conversion of incident light, and temperature distribution information indicating a temperature distribution that has been detected based on an incident electromagnetic wave;
   detecting a subject and an obstacle that exists in front of the subject from the first image;
   estimating a temperature corresponding to the subject, in front of which the obstacle exists, in the temperature distribution information based on a result of detection of the obstacle that indicates a type and density degree of the obstacle; and
   identifying a subject region that includes the subject in the temperature distribution information based on the estimated temperature.

10. A non-transitory computer-readable storage medium which stores a program for causing a computer to execute an image processing method comprising:
   obtaining a first image that has been generated through photoelectric conversion of incident light, and temperature distribution information indicating a temperature distribution that has been detected based on an incident electromagnetic wave;
   detecting a subject and an obstacle that exists in front of the subject from the first image;
   estimating a temperature corresponding to the subject, in front of which the obstacle exists, in the temperature distribution information based on a result of detection of the obstacle that indicates a type and density degree of the obstacle; and
   identifying a subject region that includes the subject in the temperature distribution information based on the estimated temperature.

* * * * *